UNITED STATES PATENT OFFICE.

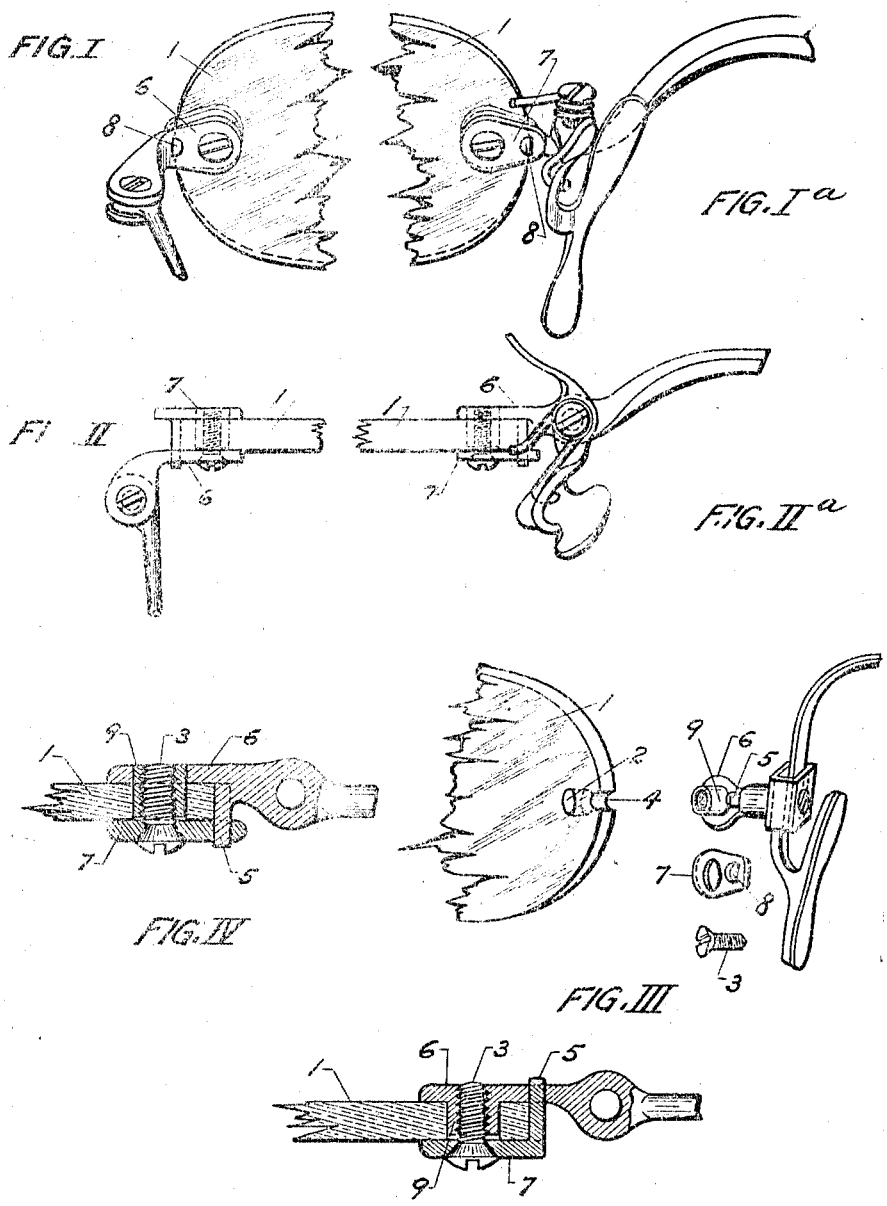

FREDERICK HAMILTON, OF PROVIDENCE, RHODE ISLAND.

EYEGLASSES AND SPECTACLES.

1,059,459.  Specification of Letters Patent.  Patented Apr. 22, 1913.

Application filed August 14, 1911. Serial No. 643,846.

*To all whom it may concern:*

Be it known that I, FREDERICK HAMILTON, a citizen of the United States, residing at Providence, in the county of Providence and State of Rhode Island, have invented certain new and useful Improvements in Eyeglasses and Spectacles, of which the following is a specification.

My invention relates to improvements in spectacles and eyeglasses and has for its object to provide an improved construction of lens clamp or attachment but it is also applicable to other uses.

My invention comprises a fixed ear, an adjustable ear adapted to accommodate various thicknesses of lenses, means for preventing the lens screw from coming in contact with the lens, and means for preventing rotary movement of the lens around the lens screw.

The object of my invention is to provide means for holding the lens securely in place, said means being adapted to prevent the lens screw from working loose and to prevent the lens from working about the lens screw as a fulcrum.

I am aware that prior to my invention means have been provided in way of the lens screw to prevent that member from coming in contact with the edge of the hole in the lens and thus to prevent the lens screw from backing out.

I am also aware that means have been provided on the periphery of a lens to hold the lens against movement but I am not aware that prior to my invention means have been adopted to prevent the screw from coming in contact with the lens and at the same time preventing motion of the lens around the lens screw.

Careful study of the art has shown that one of the greatest difficulties to be contended with in rimless eyeglasses is the loosening of lenses. This is of great importance in lenses such as cylinders, where the axis of the lens must be retained in a predetermined position before the wearer's eyes, any deflection or deviation from this position causing the prescriptive effect of the lens to be lost. Investigation of the subject has shown that the working loose of lenses and the backing out of the screw in the majority of cases is due to the fact that the lens straps or ears embracing the edge of the lens are forced back due to the long leverage of the lens with the screw as a fulcrum, the wearer usually taking the lenses by the outer edges and adjusting them to the nose. This handling of the lenses eventually forces back the strap and the lens becomes loose and works in the strap. This working in the strap will cause the lens to carry the screw around with it and in time the screw itself will back out, in this way causing a loosening of the lens both in the strap and about the screw. Therefore, it is apparent that the means adopted must perform a double function, that is, the screw must be prevented from backing out if the strap becomes loose, and means must be provided to hold the lens in fixed position with relation to the strap or else it will work around the screw attaching means as a fulcrum, and it is for the obtaining of this dual function that I have designed my lens clamp.

Study of the conditions will disclose the fact that if the lens is hold rigidly at its periphery or in the strap, even the slightest working at that point will allow a movement around the screw and this movement will tend to back out the screw unless there is something interposed between the screw and the edge of the hole in the lens. Therefore, the edge attaching means and the screw attaching means must work in coöperation with each other to perform the ideal condition which I do not believe has been done prior to my invention.

With these and other objects in view the invention consists in the novel construction and arrangement of parts hereinafter described, delineated in the drawings and specifically claimed, it being understood that changes properly falling within the scope of what is claimed may be made without departing from the spirit of my invention.

Similar numerals of reference are employed to denote corresponding parts throughout the several figures of the invention.

In the accompanying drawings: Figure I represents a fragmentary rear view in perspective of my invention employed as an end piece. Fig. I$^a$ represents a view similar to Fig. I but illustrating the use of my device in attaching a lens to an eyeglass bridge. Fig. II is a top or plan view of Fig. I. Fig. II$^a$ represents a plan view of Fig. I$^a$. Fig. III shows in perspective a collection of the parts separated. Fig. IV is a longitudinal section through the clamp showing the lens securing means inset into, and the retaining arm secured to, the fixed ear. Fig. V is a modification showing the lens attaching means integral with the fixed ear and the retaining arm secured to the adjustable ear.

Referring specifically to the drawings: The lens 1 is provided with the usual hole 2 to receive the lens screw 3 and has in its periphery or edge a recess 4 adapted to receive the retaining arm 5 of the lens clamp. This retaining arm 5 may be integral with the fixed ear 6 as shown in Fig. IV. or it may be integral with the adjustable ear 7 as shown in Fig. V. The retaining arm has a flattened side which fits into a corresponding recess 8 in the opposite ear to prevent rotation of the ear. In Fig. IV the recess is in the adjustable ear 7 whereas in Fig. V the recess is in the fixed ear 6. To prevent the screw 3 from coming into contact with the edges of the hole 2 in the lens a sleeve or tube 9 is provided in the fixed ear. This tube may be in the nature of an integral boss with the fixed ear as shown in Fig. V or it may be a bushing set into the fixed ear as shown in Fig. IV. The recess 4 in the edge or periphery of the lens is designed to fit the retaining arm 5 snugly so as to prevent any movement of the lens around the lens screw 3 as a fulcrum.

The clamp may be attached to any form of eyeglass bridge connection or spectacle temple connection. In Fig. I the clamp is shown attached to the bridge of a finger piece eyeglass, whereas in Fig. III it is shown attached to the stud connection of a spring bridge eyeglass. Fig. I also shows a spectacle and connection.

The parts are assembled as follows: The lens is drilled with the recesses 2 and 4. The bushing 9 of the clamp is placed within the recess 2. The adjustable ear is then placed on the opposite side of the lens, the screw hole being in alinement with the screw hole in the bushing, the retaining arm at the same time being adjusted in the recess 8. The screw is then put in place and tightened up, thus clamping the lens securely between the two ears, the bushing preventing the screw from coming in contact with the lens and the retaining arm in the recess 4 preventing movement of the lens around the bushing 9.

In operation, if there is a small amount of play between the edges of the recess 4 and the retaining arm, the lens will be allowed to fulcrum around the bushing 9 but as the moving lens does not come into contact with the screw there will be no tendency to back out this screw and loosen the lens laterally whereas if the retaining arm is snugly fitted in the recess 4 and the bushing 9 is also snugly fitted, the lens will be held between two retaining points and there will be no tendency for it to fulcrum about either the screw or the retaining arm.

It is apparent that several modifications may be made in the arrangement of the retaining arm and the bushing, some of which have been illustrated in the drawings. I, therefore, do not desire to be limited to the exact details shown.

Having thus described my invention, the following is what I claim as new therein and desire to secure by Letters Patent:

1. In combination with a lens having two recesses, a lens attachment having a bushing through one recess and a retaining arm through the other recess, and a clamp through the bushing.

2. In combination with a lens having two recesses, a fixed ear, a loose ear, a clamp through one recess, a retaining arm through the other recess and a bushing surrounding the clamp.

3. In combination with a lens having two recesses, a fixed ear, a loose ear, a clamp through one recess adapted to draw the loose ear toward the fixed ear, a bushing around the clamp and a retaining arm through the other recess adapted to prevent rotation about the clamp and to hold the loose ear in adjustment with the fixed ear.

In testimony whereof I affix my signature in presence of two witnesses.

FREDERICK HAMILTON.

Witnesses:
REGINALD H. WATERS,
PAUL T. TRUEMAN.